Feb. 28, 1928.
H. W. SAYLES
1,660,397
BATTERY CHARGING SYSTEM
Filed May 15, 1922
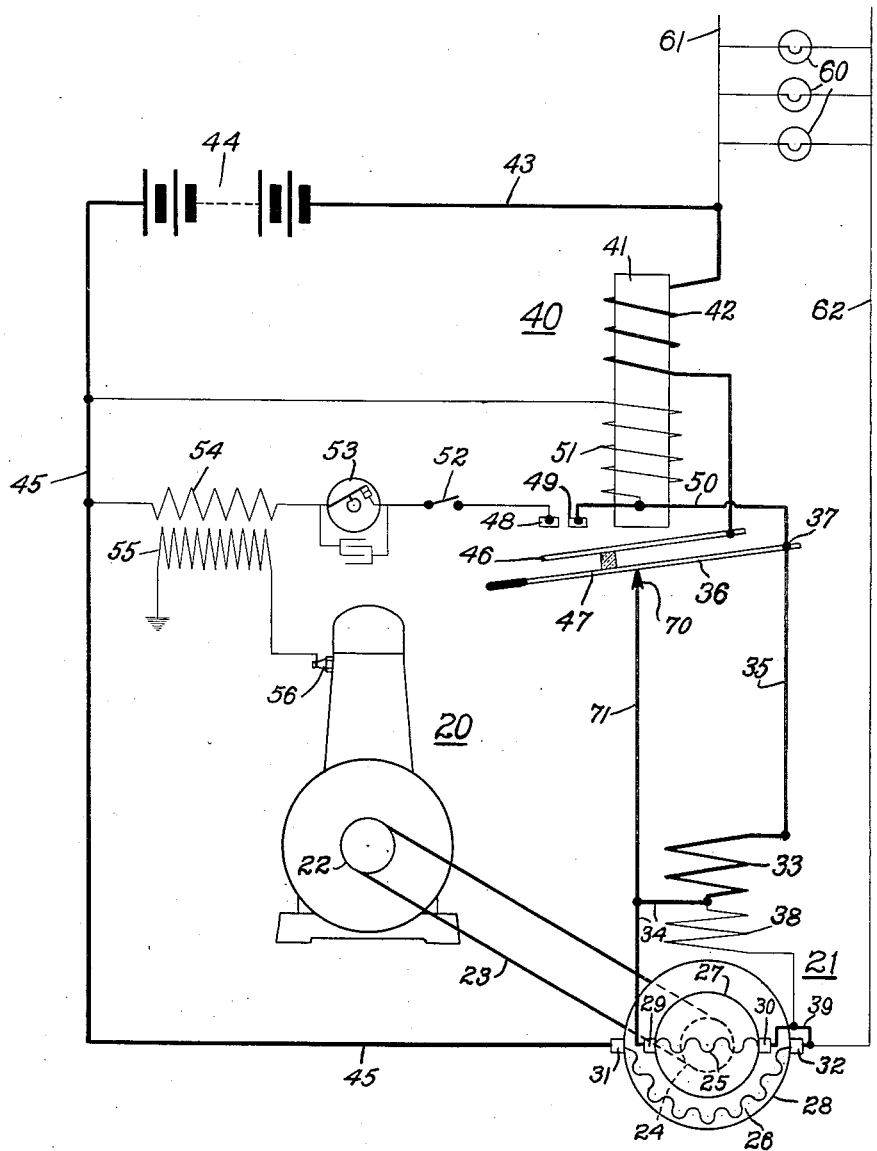
Witnesses
Warren Schmieding
Mildred Peare
Inventor
Henry W. Sayles
By J. Ralph Fehr
Attorney Patented Feb. 28, 1928.

1,660,397

UNITED STATES PATENT OFFICE.

HENRY W. SAYLES, OF PEORIA, ILLINOIS, ASSIGNOR TO DELCO-LIGHT COMPANY, OF DAYTON, OHIO, A CORPORATION OF DELAWARE.

BATTERY-CHARGING SYSTEM.

Application filed May 15, 1922. Serial No. 561,084.

This invention relates to battery charging systems wherein a dynamo-electric machine driven by internal-combustion engine operates to charge a storage battery or to receive current from the battery to crank the engine. A work circuit such as a lighting circuit receives current from the battery or from the dynamo when the latter is in operation.

It is an object of the present invention to supply current to the battery and to the work circuit at different voltages respectively and to provide means for discontinuing the battery charging operation without interrupting the work circuit, the work circuit receiving current from the battery when the battery charging operation is discontinued.

Further objects and advantages of the present invention will be apparent from the following description, reference being had to the accompanying drawing, wherein a preferred embodiment of the present invention is clearly shown.

The figure of a drawing is a wiring diagram disclosing a form of the present invention.

In the drawing:

An internal-combustion engine 20 drives a generator 21 through any suitable mechanical connection such as a pulley 22 mounted on the engine shaft and connected by a belt 23 with a pulley 24 on the generator shaft. Generator 21 is provided with two sets of armature windings 25 and 26 which are connected with commutators 27 and 28 respectively. The windings 25 are constructed and arranged to generate a voltage suitable for the work circuit, for example, 110 volts. The windings 26 are constructed and arranged to generate a voltage of such a value that when added to the work circuit voltage, the resultant voltage will be sufficient for battery charging purposes. This additional voltage is, for example, 30 volts, so that the battery will be charged at 140 volts. It is understood that generally a storage battery charged at 140 volts will when discharging deliver current at a potential of substantially 110 volts.

The commutator 27 is engaged by brushes 29 and 30, and the commutator 28 by brushes 31 and 32. Generator 21 includes series field 33 having one end connected by wire 34 with brush 29 and the other end connected by wire 35 with a pivoted starting switch lever 36 having its pivot at 37. Generator 21 includes a shunt field 38 having one end connected with wire 34 and the other end connected with wire 39 which connects brushes 30 and 32.

The controller designated as a whole by numeral 40 includes a magnet core 41 and a series winding 42 having one end connected by wire 43 with battery 44, the other terminal of the battery being connected by wire 45 with brush 31. The other end of the series coil 42 is connected with controller armature 46 which in the position shown in the drawing engages a non-conducting block 47 carried by the lever 36. Armature 46 is arranged to engage contacts 48 and 49. Contact 49 is connected by wire 50 with pivot 37 of lever 36. The controller 40 also includes a shunt winding 51 having one end connected with wire 50 and the other end connected with wire 45. Contact 48 is connected through switch 52 with ignition timer 53 and with ignition coil primary 54 which in turn is connected with wire 45. The timer 53 is driven by the engine 20 in any suitable well known manner intermittently to cause the ignition coil to produce sparking impulses in the ignition coil secondary 55, which impulses produce sparking at the spark plug 56.

The work circuit may include any suitable translation devices such as electric lamps 60 connected on the one side to a lead wire 61 which is connected with wire 43, and connected on the other side with a lead wire 62 which is connected with generator brush 32.

Where it is desirable to maintain the voltage constant across the lead wires 61 and 62 although the current consumed may vary any well known form of regulator may be provided. Such a regulator may include a series winding for compounding the generator field cumulatively, or the regulator may include a voltage control for the engine throttle so that as more current is consumed in the work circuit any tendency of the generator speed and engine speed to drop will be counteracted by the opening of the engine throttle valve.

The operation of the invention is as follows. The diagram shows the circuits with the engine inoperative. The battery is discharging current into the work circuit through wires 45, brush 31, armature winding 26, brush 32, wires 62, 61, and 43. It is understood that the armature winding 26 is constructed and arranged to carry 110 volts, for example, although but 30 volts, for example, are generated in this winding. When it is desired to charge the storage battery, the lever 36 is pulled up thus moving the armature 46 into engagement with contacts 48 and 49. The switch 52 being closed ignition current will be provided by the battery through wire 45, coil 54, timer 53, switch 52, contact 48, armature 46, coil 42, wire 43. The dynamo 21 will receive current from the battery and will operate as a motor to crank the engine. The cranking circuit includes battery 44, wire 45, brush 31, armature winding 26, brush 32, wire 39, brush 30, armature winding 25, brush 29, wire 34, series field 33, wire 35, pivot 37, wire 50, contact 49, armature 46, series coil 42, and wire 43. The shunt field 38 will also be connected so that the generator will act as a compound motor with a field of relatively high intensity for engine starting. During this cranking operation the windings 42 and 51 operate differentially so that manual effort is required to hold the armature 46 in circuit closing position. When the engine has become self-operative and attains a speed such that the dynamo 21 is charging the battery, the coil 42 will receive current in the reverse direction and coils 42 and 51 will act cumulatively and so energize the core 41 that the armature 46 will be held in attracted position, whereupon the lever 36 may be released. This lever will then fall back into engagement with contact 70 which is connected by wire 71 with wire 34. The series field 33 will then be short circuited and the dynamo 21 will then act as a shunt wound generator during the charging operation.

It will be noted that the operation of bringing the engine and dynamo into use as a battery charging plant has been accomplished without interruption of the work circuit and that the circuits are so arranged that while 110 volts, for example, is impressed upon the work circuit, a higher voltage, for example, 140 volts is impressed upon the battery charging circuit. The work circuit includes the following connections: 110 volt armature winding 25, brush 29, wire 34, wire 71, contact 70, lever 36, pivot 37, wire 50, contact 49, armature 46, series winding 42, lead wire 61, lamp 60, wire 62, wire 39, back to brush 30. The battery charging circuit includes the following connections: armature winding 25, brush 30, wire 39, brush 32, armature winding 26, brush 31, wire 45, battery 44, wire 43, and connections from wire 43 down to the brush 29 which are the same as mentioned in connection with the work circuit during the battery charging operation.

A further advantage of the invention is that the battery charging operation may be discontinued without interrupting the work circuit. The engine may be stopped in different ways such as, for example, by opening the ignition switch 52 or by cutting off the supply of fuel to the engine. As the engine slows down and the potential of the generator falls off the battery will begin to send current into the generator and there will be a reversal of current in the series coil 42. Windings 51 and 42 will then act differentially and so that there will not be enough magnetism in the core 41 to hold the armature 46 in closing position against the action of gravity or a spring. Therefore the flow of current from the battery to the generator will be interrupted by the movement of armature 46 away from contact 49. However, this circuit interruption does not affect the work circuit substantially, since this circuit will still be connected with the battery 44 through the armature winding 26 as stated before.

Though the armature windings 25 and 26 are herein shown and described as carried on a single armature, the present invention contemplates any equivalent construction producing the results described, and in actual practice the windings may be carried by separate armatures or dynamos suitably connected together, as is well understood by those skilled in the art. Any suitable means, other than the engine 20, may be employed for driving the dynamo.

While the form of mechanism herein shown and described constitutes a preferred embodiment of one form of the invention, it is to be understood that other forms might be adopted and various changes and alterations made in the shape, size, and proportion of the elements therein without departing from the spirit and scope of the invention.

What is claimed is as follows:

1. In an electrical generating system, the combination with an internal-combustion engine, a work circuit and a storage battery; of a dynamo operable upon current from the battery for cranking the engine and having generating circuits providing current at two different voltages respectively; means for connecting the battery with the work circuit; and manually controlled circuit connections operable to connect the battery with the dynamo to operate the latter as a motor, said connections having means for automatically maintaining in operative condition after the engine has become self-operative a circuit between the battery and a high voltage generating circuit, and a circuit between the lower voltage generating circuit and the work circuit.

2. In an electrical generating system, the combination with an internal-combustion engine, a work circuit and a storage battery;

of a dynamo having field windings and two armature windings, the first winding adapted to produce current at a voltage suitable for the work circuit, the second winding producing current at a relatively lower voltage; means for connecting the storage battery with the work circuit; and circuit connecting means including manual means for connecting the battery with the dynamo to operate the latter as a motor to crank the engine, and including automatic means for maintaining closed while the engine is self-operative a connection between the battery and both the armature windings and a connection between work circuit and the first armature winding.

3. In an electrical generating system, the combination with an internal-combustion engine, a work circuit and a storage battery; of a dynamo having a series field and a shunt field and two armature windings, the first winding adapted to produce current at a voltage suitable for the work circuit, the second winding producing current at a relatively lower voltage; means for connecting the storage battery with the work circuit and circuit connecting means including manual means operable to connect a dynamo with the battery to operate the dynamo as a cumulative compound motor to crank the engine, said manual means being arranged to render the series field winding inoperative when said manual means is released, said circuit connecting means including automatic devices for maintaining in operative condition after the engine has become self-operative a circuit between the battery and both the armature windings and a connection between the work circuit and the first armature winding.

4. In an electrical generating system, the combination with an internal-combustion engine, a work circuit and a storage battery; of a dynamo having series and shunt field windings, said dynamo being operable upon current from the battery for cranking the engine and having generating circuits providing current at two different voltages respectively; and circuit connections operable to connect the battery with the dynamo to operate the latter as a motor with compound characteristics, said connections having provisions for causing said dynamo to operate with shunt characteristics after the engine has become self-operative, and for maintaining in operative condition a circuit between the battery and a high voltage generating circuit, and a circuit between the lower voltage generating circuit and the work circuit.

In testimony whereof I hereto affix my signature.

HENRY W. SAYLES.